(12) United States Patent
Short

(10) Patent No.: US 11,959,051 B2
(45) Date of Patent: Apr. 16, 2024

(54) METHOD FOR CREATING A CRAFT BEER WITH LOW ALCOHOL CONTENT

(71) Applicant: Paul Short, Albuquerque, NM (US)

(72) Inventor: Paul Short, Albuquerque, NM (US)

(*) Notice: Subject to any disclaimer, the term of this patent is extended or adjusted under 35 U.S.C. 154(b) by 343 days.

(21) Appl. No.: 17/210,791

(22) Filed: Mar. 24, 2021

(65) Prior Publication Data
US 2022/0306973 A1 Sep. 29, 2022

(51) Int. Cl.
*C12C 12/04* (2006.01)
*C12C 11/00* (2006.01)
*C12C 11/11* (2019.01)
*C12H 3/02* (2019.01)

(52) U.S. Cl.
CPC ............ *C12C 12/04* (2013.01); *C12C 11/003* (2013.01); *C12C 11/11* (2013.01); *C12H 3/02* (2019.02)

(58) Field of Classification Search
CPC ....... C12C 11/06; C12C 11/003; C12C 12/04; C12C 11/11; C12C 11/02
See application file for complete search history.

(56) References Cited

FOREIGN PATENT DOCUMENTS

| DE | 3920506 C2 * | 12/1998 | ............ C12C 12/04 |
| PL | 199934 B1 * | 11/2008 | |
| RU | 2396007 C1 * | 8/2010 | |

* cited by examiner

*Primary Examiner* — Vera Stulii
(74) *Attorney, Agent, or Firm* — V Gerald Grafe

(57) ABSTRACT

The present invention relates primarily to craft beer, specifically the creation of a method to create flavorful non-alcoholic and low-alcoholic versions of virtually any style of craft beer. It also relates to craft distilled spirits, primarily craft whiskey. Additionally, it relates to the creation of other non-alcoholic and low-alcoholic versions of other beverages such as wine (including grape or other fruit) or cider, and other craft distilled spirits such as brandy and vodka.

7 Claims, 6 Drawing Sheets

METHOD FOR CREATING A CRAFT BEER WITH LOW ALCOHOL CONTENT

FIELD OF THE INVENTION

The present invention relates primarily to craft beer, specifically the creation of a method to create flavorful non-alcoholic and low-alcoholic versions of virtually any style of craft beer. It also relates to craft distilled spirits, primarily craft whiskey. Additionally, it relates to the creation of other non-alcoholic and low-alcoholic versions of other beverages such as wine (including grape or other fruit) or cider, and other craft distilled spirits such as brandy and vodka.

BACKGROUND OF THE INVENTION

Craft Beer. Craft beer production has been growing rapidly in the last few decades. Though the term is somewhat imprecise, Craft beer is generally defined as beer produced by small, independent breweries using traditional methods. There are dozens of styles of craft beer, including Porter, Stout, Amber, and India Pale Ale to name a few. They are typically flavorful and colorful compared to beers produced by larger brewers, or 'macro beers' such as Coors, Miller, and Budweiser. Each craft beer brewer will have its own recipe with unique flavors in their version of craft beer styles.

A simplified 'traditional method' of making craft beer is shown in FIG. 1.

The first step in creating a craft beer is the creation of a 'wort,' which is an unfermented beer (FIG. 1, step 1). This is done by extracting substances, mostly sugars, from malted (sprouted) grain, mostly barley but can include wheat or other grains, by soaking the grain in water that is between about 145° F. and 165° F. for approximately an hour. This soaking process is called Mashing. The brewer can do this extraction or buy off-the-shelf versions of already extracted sugars, call Malt Extract.

This extract is used by the brewer to create the wort. This is done by dissolving the extract into water, boiling it along with hops and other ingredients, and cooling. It is then ready for fermentation.

In general, the greater the amount of malts added to the wort, the more malt flavors the beer has, and the more alcohol it will contain. In lighter beers, those with less alcohol and body (such as the typical mass-produced beers,) there are fewer malts added. This results in a beer with less flavor, less complex flavor, and perhaps 4% Alcohol by Volume (ABV). However, in heavier-bodied beers there is more malt weight and variety, which results in a more flavorful, complex beer that can have has much as 8% to 15% ABV.

An important part of the boiling of the wort is the addition of hops (FIG. 1, step 1d). Hops add various flavors and bitterness to a beer. The bitterness is created by boiling the hops in the wort, where alpha acids present in the hops are isomerized, creating a bitter compound that adds the desired flavor to the wort. The amount and speed of isomerization depends on many factors; one important one is the density of the sugars from the malts. The more sugar is dissolved in the wort, the slower the isomerization is, and thus more hops are needed to achieve a desired bitterness.

The Wort is described by three major parameters: Gravity, Color, and Bitterness.

Wort Gravity. This parameter is a measurement of the density of the wort. Distilled water has a gravity of 1.000, and ethanol has a gravity of approximately 0.797. The sugars and other substances from the malts add to the gravity of the wort. The Original Gravity (OG) is the gravity of the wort after boiling, and just prior to fermentation. The OG indicates to the brewer how much body the resulting beer will contain, and how much alcohol will be produced. Lighter gravity worts have an OG in the 1.030 to 1.045 range, while very heavy gravity beers will have an OG of above 1.080.

There are multiple ways to measure the gravity, including Specific Gravity (which this description will use), Plato, and Brix. These other measures are applicable as each measure of gravity can be simply converted to another.

Calculating Original Gravity. In designing a beer, the Original Gravity is one of the most important design points. To predict the OG, brewers will know from the supplier the gravity that each ingredient will add per pound of ingredient in one gallon of water, hereafter called GPG (Gravity per Pound per Gallon). Producers of either malted grain or extract will typically give a GPG for each ingredient. For instance, with base malt grain it will be around 0.035 points per pound per gallon. That is, one pound of grain of grain mashed in one gallon of water will produce a solution with a gravity of 1.035. Similarly, one pound of Dried Malt Extract (DME, the dried residue from a manufacturer who has mashed some grains, created a wort, and dehydrated it) dissolved in one gallon will produce a solution with a gravity of about 1.042.

The GPG used in this discussion will be assumed to include an efficiency product; that is, it will be the gravity actually added. For DME, this factor will be 100% or very nearly so. For grain, this efficiency will depend not only on the specific grain, but also on the specific brewery's methods and equipment, but can vary from 20% to over 90%. So the GPGs described hereafter include the efficiency.

To estimate the OG of the wort, the following equation is used $$OG = 1 + \frac{\sum_{k=1}^{n} W_k * GPG_k}{V_w} \quad (1)$$

Where
$W_k$=Weight of the $k^{th}$ ingredient, pounds
$GPG_k$=Gravity per Pound per Gallon of the $k^{th}$ ingredient, including efficiency
$V_w$=Volume of the Wort after boiling, gallons
n=Number of Ingredients The equations in this description assume the use of Imperial units, though they can easily be applied to Metric units.

Wort Color. The color of the wort, and the resulting beer, is often measured by the Standard Reference Method, which assigns a number to the color of beer, low numbers being light and higher numbers being darker. 40 is considered a black beer. SRM is calculated using Morey's formula:

$$SRM = 1.4922 * (MCU^{0.6859}) \quad (2)$$

Where $$MCU = \text{Malt Color Units} = \frac{\sum_{i=1}^{n} MC_i * W_i}{V} \quad (3)$$

And
MCU=Malt Color Units $MC_i$=Color of malt ingredient i in Degrees Lovibond
$W_i$=Weight of malt ingredient i in pounds
V=Volume of Beer Each type of beer, such as a Pilsner, Amber, or Porter, has an SRM color range that is standard for it. Brewers will add malts and adjuncts with various colors until the beer design meets that range.

Wort Bitterness. Hops added to the boil of the wort add bitterness as the alpha acids in the hops are isomerized. Beer bitterness is measured in International Bitterness Units (IBUs), and is one of the most important ways that beer is measured and enjoyed. The typical way the bitterness is calculated is with the following equations:

$$IBU = \frac{AAU * U * 75}{V} \quad (4)$$

Where:
AAU=Alpha Acid Units
V=Volume of Boil
U=Utilization

AAU is calculated simply by taking the weight of the hops added and multiplying by the percentage of alpha acids in the particular hop variety being boiled:

AAU=Weight of hops*Alpha Acid Percentage in hops (5)

The Utilization (U) is a much more complex factor that must take into account the gravity of the boiling wort, and the time it is boiled. The equations used for this came from an industry-standard method developed by Tinseth, as follows:

$$U = F(G) * F(T) \quad (6)$$

Where $$F(G) = 1.65 * 0.000125^{(Gb-1)} \quad (7)$$

$$F(T) = \frac{1 - e^{-0.04*T}}{4.15} \quad (8)$$

And
Gb=Gravity of the boiling wort
T=Time the specific hop amount is boiled

In many cases, there is more than one hop variety added, and each hop addition can be boiled for different times. In this case, $$IBU = \frac{75 * \sum_{k=1}^{n} AAU_k * U_k}{V} \quad (9)$$

Where each AAU and Utilization is calculated from the alpha acid percentage, hop addition weight, and boil time for each hop addition and there are n hop additions.

In parallel with creating the wort, the yeast is readied for fermentation (FIG. 1 step 2). Typically this involves the creation of a Yeast Starter, in which a small amount of DME or LME is boiled, and then dried or liquid yeast is added to it. This allows the yeast to multiply to the number needed to ferment the wort properly. It is also possible to add dried, rehydrated, or liquid yeast rather than a yeast starter.

The wort is then transferred to a Fermenter and the yeast is added. The yeast then ferments the sugars in the wort (FIG. 1, step 3), transforming them into a combination of ethanol and carbon dioxide. As this happens, the wort is transformed into beer. Small amounts of other compounds are created, which might be important to the flavor of the beer.

Two important factors in measuring the fermentation are Final Gravity and Attenuation. The Final Gravity (FG) is the gravity of the beer after fermentation. The gravity will be lessened by the conversion of the denser sugars into ethanol and carbon dioxide. The ethanol remains in the beer, and as it has a lower density than water or the sugars, decreases the gravity. The carbon dioxide is discharged into the atmosphere, which further decreases the gravity. Attenuation (A) is the percentage of sugars (or the Original Gravity) that are fermented by the yeast. So $$A = \frac{(OG - FG)}{(OG - 1)} \quad (10)$$

The predicted Alcohol by Volume (ABV) of the final beer is approximated by equations. There are varied equations that are used in beer brewing, and each has its pros and cons. The simplest equation is:

$$ABV=(OG-FG)*131.35 \quad (11)$$

This is for OG and FG stated in Specific Gravity—if stated in Plato or other units, the equation can be modified for that unit type. So, a brewer will calculate the OG and the FG and thus determine the predicted alcoholic content of the beer. However, $$FG=(OG-1)*(1-A)+1 \quad (12)$$

Where A is the attenuation.
So $$OG-FG=OG-((OG-1)*(1-A)+1) \quad (13)$$

Or $$OG-FG=(OG-1)*A \quad (14)$$

And $$ABV=(OG-1)*A*131.25 \quad (15)$$

This equation works well for low-gravity beers, but has more error in higher gravity beers. For that, the following equation is often used:

$$ABV = \left(76.08 * \frac{(OG - FG)}{1.775 - OG}\right) * \left(\frac{FG}{0.794}\right) \quad (16)$$

Expressing this in terms only of OG, we have $$ABV = \left(76.08 * \frac{A * (OG - 1)}{1.775 - OG}\right) * \left(\frac{OG * (1 - A) + A}{0.794}\right) \quad (17)$$

Using Equation 1:

$$OG = 1 + \frac{\Sigma_n^1 W_k * GPG_k}{V_w} \quad (1)$$

And substituting, we get:

$$ABV = \left(76.08 * A * \frac{\Sigma_n^1 W_k * GPG_k}{V_w * (1.775 - OG)}\right) * \left(\frac{1 + (1-A) * \frac{\Sigma_n^1 W_k * GPG_k}{V_w}}{0.794}\right) \quad (18)$$

All of these equations give only approximations to what the actual ABV will be, but it can be quite close if the process is controlled well.

The process of the yeast converting the available sugars into ethanol and carbon dioxide is called Primary Fermentation. Once that is complete, the yeast still performs other functions which result in a better-tasting beer. This is called Conditioning or Secondary Fermentation (FIG. 1, step 4). Conditioning is often conducted in a separate fermentation chamber. During Conditioning, additional flavorings such as hops (called 'dry-hopping' when done at this stage), fruit, coffee, chocolate, or many other flavorings, will be added (FIG. 1, step 5).

The beer is then clarified (FIG. 1, step 6), which can mean filtering or it can mean letting it sit in a tank and letting the yeast settle, or possibly both. The beer can then be packaged (FIG. 1, step 7), in kegs, bottles, cans, or other containers, that are used to ship and distribute to the beer drinker.

The actual brewing process is more complicated than is described here, and recipes include many kinds of malted and un-malted grains, some of which might have been roasted to create more complex flavors, many kinds of hops boiled for varied times, along with other ingredients and processes that affect the beer's flavor. Yeast additions and calculations are a very complex discussion of itself. However, none this complexity affects the workings of the invention described herein.

Low-Alcoholic Beer. Creating a low-alcohol beer (with ABV of 4% or less) using the above method typically means simply adding fewer malts to create a lower amount of fermentable sugar. That is, the Original Gravity is lowered. This makes it difficult to make a very low ABV beer of, say 2.5% ABV, with a great deal of flavor. Using these traditional methods, the lowest ABV found is around 2.5%, and typically more like 3%, in the case of Scottish Lights and British Bitters. It is very difficult, if not impossible, to create a beer with a great deal of malt flavor, that also has a low alcoholic content with the traditional process.

Non-Alcoholic Beer. Non-alcoholic (NA) beer (technically Non-Alcoholic Malt Beverage) must, by law in the United States, have less than 0.5% ABV ethanol, though that percentage differs in other parts of the world. It usually made by large brewers; non-alcoholic beer has been rare in the craft beer community, though a handful of craft brewers have introduced NA craft beer. Brewers typically use one of two methods to create it:

Evaporation. The brewers make a beer and evaporate off the alcohol. Alcohol has a lower boiling point than water, so at any given temperature more ethanol will evaporate than water. To get the evaporation rate up to something that is economical, brewers either heat the beer up to a high temperature (as high as 200 F.) or create a vacuum over the beer. A vacuum has the effect of lowering the temperature at which the ethanol will evaporate quickly. Lowering the temperature helps maintain the flavors of the beer. As noted above, the bitterness from the hops is dependent upon the time the wort or beer spends at the boiling point, so producing an NA beer this way can dramatically affect the bitterness and hop aromas. Virtually all of the hop aromas will be driven off using this method, which dramatically limits the kinds of flavors that can be added to the beer.

The ethanol is evaporated until it has less than 0.5% ABV. It is then carbonated and packaged (typically cans or bottles.)

Reverse Osmosis. In the Reverse Osmosis (RO) method of creating NA beer, a beer is made per the above process and then it is run through membranes that allow only water and ethanol through (along with a small amount of other flavor compounds). Most of the other flavor compounds remain behind. The ethanol/water combination is then heated to remove the ethanol, and the falvor compounds are added back into the beer.

In any case, virtually all NA beer is very light, with little body and low flavor. Using the above methods it is difficult to create a full-bodied India Pale Ale or Stout, for instance. In the U.S. craft beer industry, non-alcoholic is quite rare, and beer below 5% ABV is even somewhat rare.

Background of Craft Distilled Spirits

Craft distilled spirits are another popular and growing product. Local micro-distilleries make a wide variety of distilled spirits including vodka, rum, various whiskeys, brandies, and others. For this background, we will emphasize the making of malt whiskeys, though much of the discussion relates to all craft distilled spirits.

FIG. 2 shows a typical process by which a craft malt whiskey is made. Much like making beer, sugar is extracted from malts, mostly malted barley. This is done in an identical fashion to beer, by soaking the malted grain in warm water, which is called mashing (FIG. 2, step 1). Some malt whiskeys also include a portion of other grains such as corn, rye, or wheat. This creates a fluid with the sugars and other ingredients, called a wort, again, just like beer.

Unlike beer, where the wort is always boiled, in making a malt whiskey the wort may or may not be boiled. In addition, no hops are added to the typical whiskey wort, and the addition of malts other than base malts is very rare; that is, very few crystal malts or adjuncts are added.

In any event, the wort is cooled to a specific point, and yeast is added (FIG. 2, step 2.) The yeast used in whiskey is typically a different strain than that used in making beer. The wort is then fermented into a beer (FIG. 2, step 3).

Once the beer has fully fermented, it is then distilled in a two-step process. The first step is called a stripping run (FIG. 2, step 4). In this, the beer is heated to a point where it begins to boil, and a slow boil is maintained. Because ethanol has a lower boiling temperature than water, the resulting steam that comes off the boiling beer has a much higher percentage of ethanol than does the beer. And, while this steam is largely ethanol and water, a small amount of the other constituents of the beer end up here. These are called congeners, and add the distinctive flavors of distilled spirits. The second step in distillation is the condensing of that steam by running it through a pipe that is cooled on the outside. The cooling causes the steam to condense, and this condensation is called Low Wines in the case of a stripping run. The distillation process continues until the low wines reach a certain level of ethanol concentration. The precise point is up to the particular distiller.

The remainder of the beer left over after the stripping run distillation process is called Backset. It is typically thrown out or used for a non-potable use.

The low wines are stored (FIG. 2, step 5), and are combined with low wines from other stripping runs. When the volume of low wines gets to be sufficient, it is run through another distillation process called the Spirit Run (FIG. 2, step 6). This typically uses the same equipment as was used in the stripping runs, but not necessarily. The spirit run uses the same distillation process, where the low wines are heated to a boil, boiled slowly, and the steam condensed. This condensation creates the spirit that is desired—in this case, malt whiskey. The spirit run is typically run more slowly than a stripping run, and not all of the condensate is used. The portions used are up to the distiller.

There are many different kinds of stills, the equipment used for distillation. The two main categories are Pot Stills and Reflux Stills. Whiskey is made with a pot still typically. For the spirit run, a reflux still might be used, as these can create spirits that are much more pure than a pot still. Again, all this is up to the distiller, though there are many labeling laws that require whiskies to be made a certain way.

Once the spirit run is complete, the whiskey now is aged (FIG. 2, step 7). It is typically aged with oak, sometimes in oak barrels and sometimes with oak cubes or chips soaking in the whiskey. The type of oak, whether it is charred or toasted, the length of time the whiskey is aged are all up to the distiller, again subject to labeling laws.

After aging is complete, the whiskey is packaged for sale (FIG. 2, step 8).

Other craft distilled spirits are made in a similar manner, but the ingredients are different. Rum, for instance uses sugar (usually in the form of molasses) as the fermentable ingredient, brandy uses fruit, and tequila blue agave. These won't be mashed in the same way, but most are aged similarly, though that differs.

SUMMARY OF THE INVENTION

Current craft beer is made using a single wort with, in the vast majority of cases, a single fermentation. With the present invention, the beverage is made using two worts, a base wort and a flavor wort, and is subject to two fermentations. This is shown in FIG. 3.

This invention can be used to make beer that is 3.5% ABV or less, an ABV range that is not practical with conventional methods.

The base wort (FIG. 3, step 1) contains the majority of the fermentable malts within the overall beverage or beer, but typically less or none of the flavorful components such as hops, specialty malts or grains, and non-fermentable sugars. Yeast is then added to this base wort (FIG. 3, step 2) and then fermented in a typical fashion in what is termed the Base Ferment (FIG. 3, step 3), which creates a Base Beer with some value of alcoholic content.

The Base Beer is then run through an alcohol removal process (FIG. 3, step 5). This can be any process, including Reverse Osmosis and vacuum evaporation, including as an example evaporation by heating and accompanied by distillation. This can be done because many of the flavor compounds like alpha acids from hops are not in the base beer; the base beer is heated as is, and additional heat creates only small changes to the malt characteristics. This results in liquid that has the residual malt flavors, but only a very small amount of alcohol. This liquid is called the Base Liquor, and is now essentially a malt beverage with no alcohol or a very small amount of alcohol.

A second wort, called the Flavor Wort, is then brewed (FIG. 3, step 6). The Flavor Wort is a beer wort that contains additional flavors. It is made in the normal fashion for a wort: mashing or steeping grains, boiling, and adding hops, as examples. The Base Wort will typically not include hops of any sort, as the alcohol removal process may modify those hop flavors. The Flavor Wort will contain the hops needed to achieve a desired bitterness and flavor characteristic. A Flavor Wort can also contain specialty grains such as crystal malts or oats, which will contribute the desired flavors and textures to create a specific style of beer.

The fermentable component of the Flavor Wort must be such that the resulting alcohol generated will result in the desired amount in the Combined Beer. For instance, if a non-alcoholic beverage is desired, then the fermentables in the Flavor Wort plus any remaining ethanol in the Base Liquor must generate less than 0.5% ABV in the Combined Beer.

The Flavor Wort is mixed with the Base Liquor to create a Combined Wort. This is then fermented in a Combined Fermentation (FIG. 3, step 7). This is different than what is referred to in the brewing industry as Secondary Fermentation. A Combined Fermentation is another, separate and full fermentation, even though the amount of fermentables in the Combined Wort will be quite low compared to an average craft beer.

The Combined Fermentation creates a new beer that is either non-alcoholic (if the fermentables generate less than 0.5% ABV) or a very low alcoholic beer (e.g., 2%). However, these beers will have a great deal of flavor due to the malts left over from the Base Beer and the new ones in the Flavor Beer.

The beer produced by the Combined Ferment is then Conditioned (FIG. 3, step 8), flavored (FIG. 3, step 9), clarified and carbonated (FIG. 3, step 10), and packaged in the same manner as a normal craft beer.

DETAILED DESCRIPTION OF THE INVENTION

Figure 1:
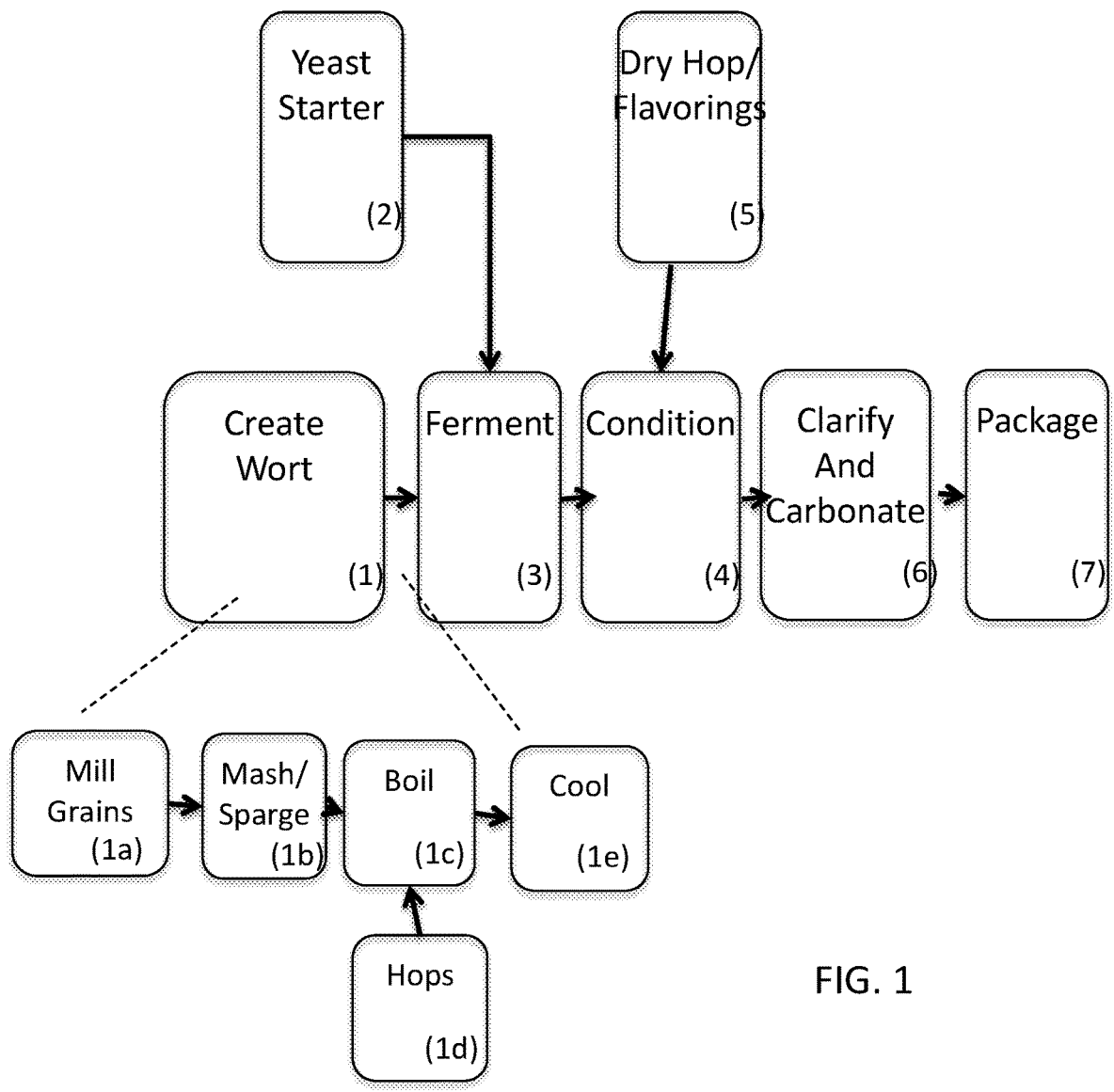
FIG. 1 is a schematic representation of a typical craft beer-making process.
Figure 2:
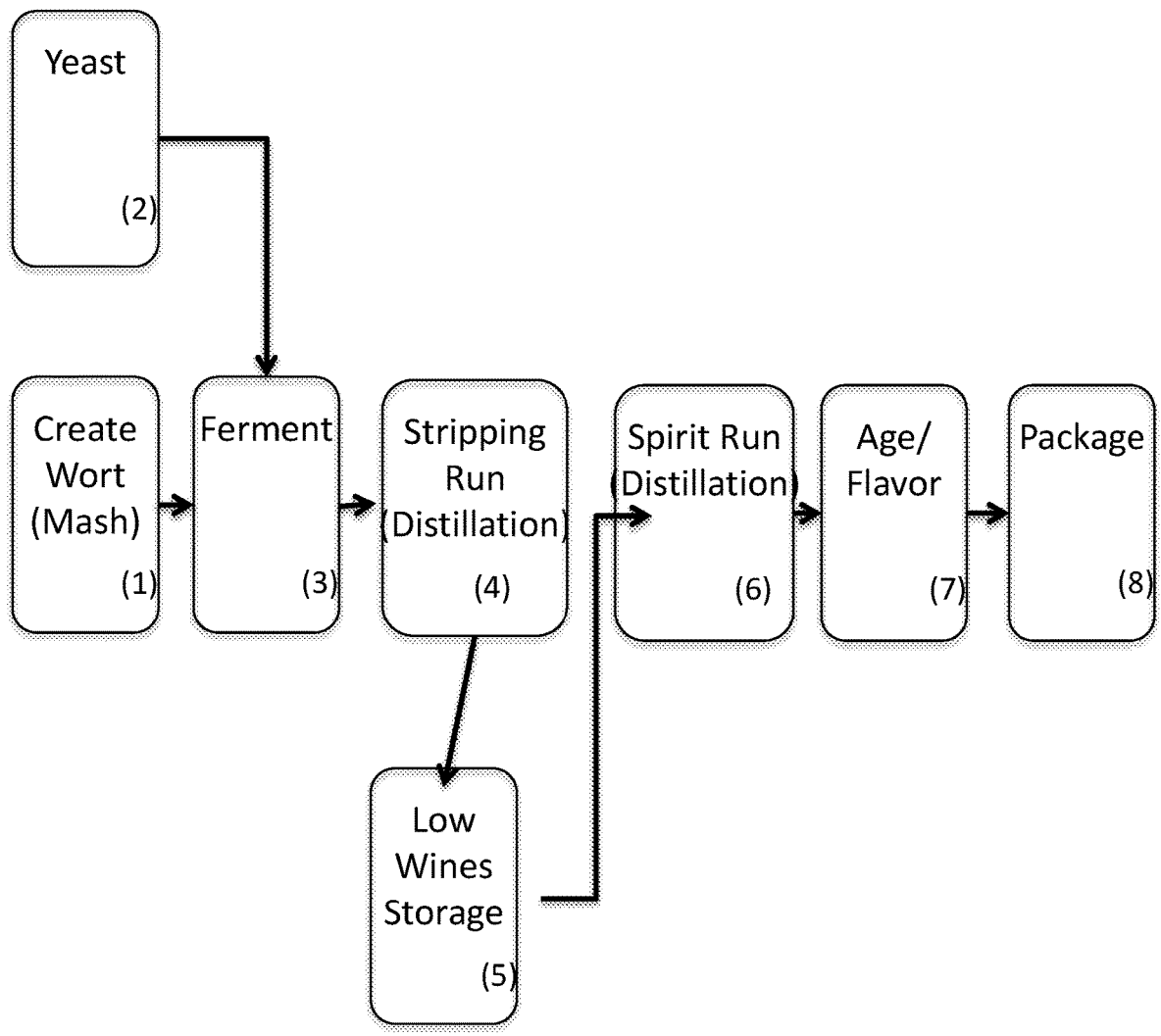
FIG. 2 is a simplified schematic representation of a typical craft distilled spirit making process.
Figure 3:
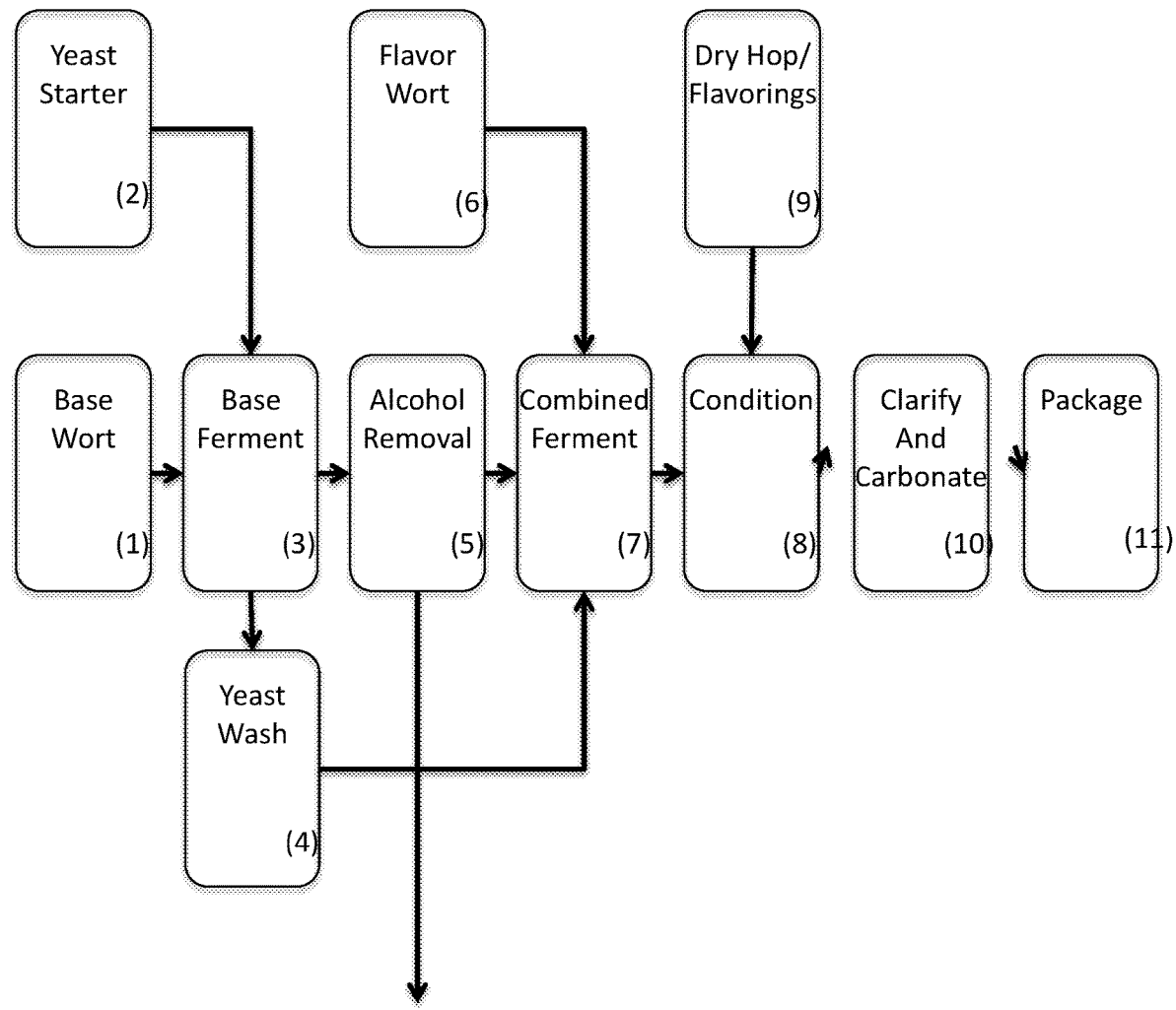
FIG. 3 is a schematic representation of the core process for making non-alcoholic or low-alcoholic craft beer.
Figure 4:
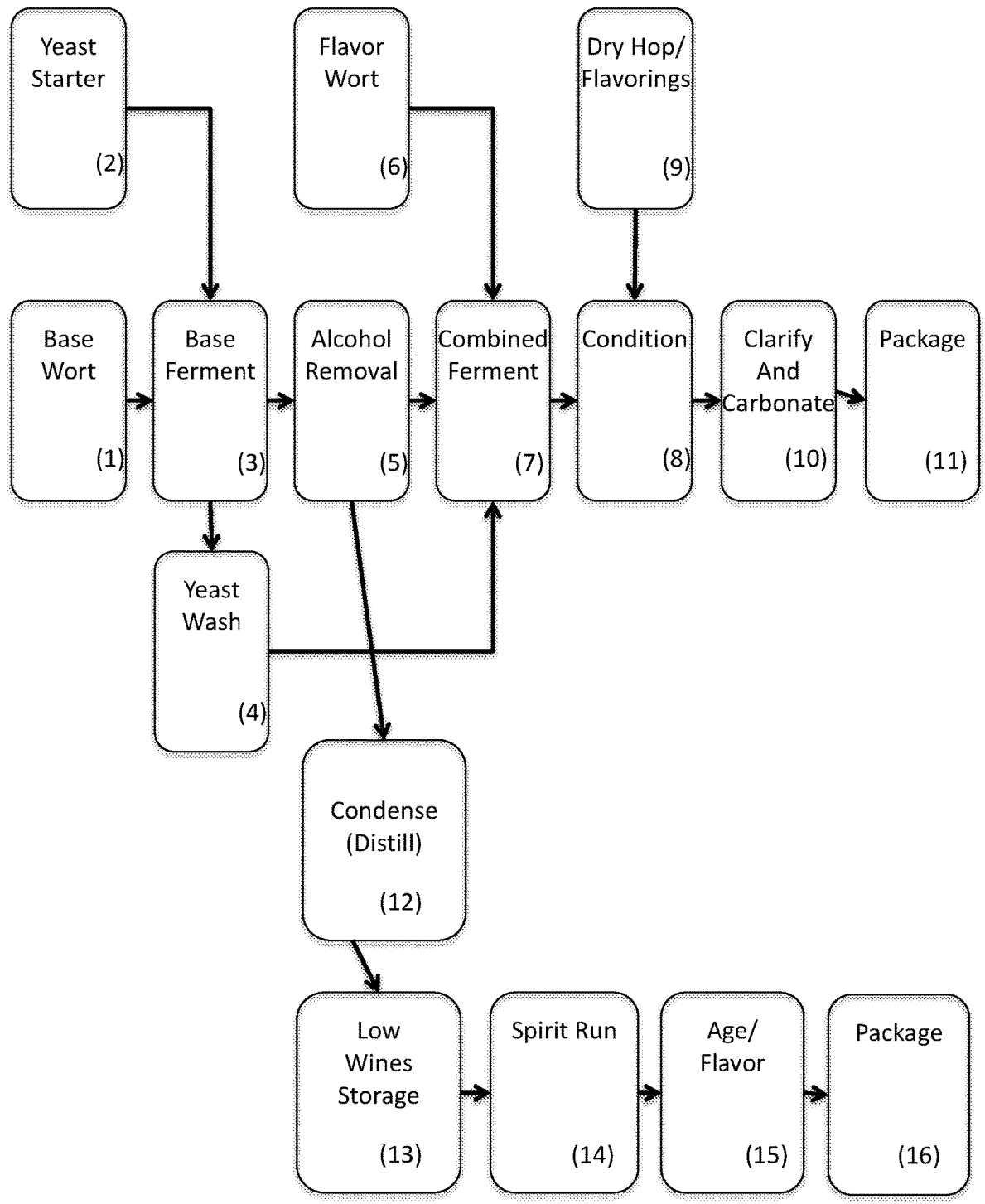
FIG. 4 is an illustration of an example method A of implementing the invention that included an ethanol distillation methodology as the Alcohol Removal Process.

FIG. 4 is an illustration of an example embodiment A of the invention, and will be referenced throughout this section. This embodiment combines the process of making an NA/LA beer with the process of making whiskey; both products are produced with little additional marginal effort compared to producing either one separately.

Base Beer. The first step in the embodiment is to create a Base Wort (FIG. 4, step 1). This wort is created like a standard craft beer wort, but it will include only a subset of the ingredients for the beer. The Base Beer will typically include the Base Malts, or the malts that create most of the Gravity of the final Combined Beer, but contribute only some of the flavors. There is an Original Gravity of the Base Beer, $OG_B$ that is calculated in the same manner as the OG of normal beer, including only the ingredients in the base beer:

$$OG_B = 1 + \frac{\sum_{i=1}^{n} W_i * GPG_i}{V_B} \quad (19)$$

Where
 $W_i$=Weight of the $i^{th}$ Base Beer ingredient
 $GPG_i$=Gravity per Pound per Gallon of the $i^{th}$ Base Beer ingredient including efficiencies
 $V_B$=Volume of the Base Wort after boiling
 n=Number of Ingredients in Base Beer In addition, the volume for the base beer is adjusted so that the overall volume of the combined beer will be what is desired. The base beer volume can be set to many values, but is typically set so that the gravities for both the base beer and the flavor beer are reasonable (less than 1.070 typically, but can be higher or lower).

Yeast is prepared in a standard way (FIG. 4, step 2). The Base Wort is then transferred to a fermenting vessel, and yeast is added to it. Base Fermentation (FIG. 4, step 3) then begins, and the sugars are converted to alcohol. We assume a maximum attenuation, so the fermentation will go on until the attenuation is reached. For the base beer, we will use the alternate equation for estimating ABV, as the base beer will tend to be higher in alcohol and thus the alternate will be more accurate.

$$ABV_B = \left(76.08 * A_M * \frac{\Sigma_n^1 W_k * GPG_k}{V_B * 0.775 - \Sigma_n^1 W_k * GPG_k}\right) * \left(\frac{1 + (1 - A_M) * \frac{\Sigma_n^1 W_k * GPG_k}{V_B}}{0.794}\right) \quad (20)$$

This is the maximum ABV, as AM is the maximum expected attenuation.

It is important that the Base Beer is fully attenuated. That is, all of the fermentable sugars have been converted to ethanol. Otherwise, additional attenuation may occur during the combined fermentation, which will throw off the ABV calculations for the combined beer. It may be necessary to leave the Base Beer in the fermenter longer, or even introduce additional yeast so that the attenuation is reached.

As the fermentation comes to an end, a large percentage of the yeast tend to fall to the bottom of the fermenter. They are still living for the most part. In a typical application of this embodiment, the yeast is gathered from the fermenter and 'washed,' which is a brewing term for running clean, sterilized water through the yeast in order to cleanse it of any non-yeast material. This results in an amount of yeast that can be re-used, and is typically used for the Combined Ferment (FIG. 4, step 7), though this is not necessary, as fresh yeast can be introduced at that point.

The Base Beer is now ready for alcohol removal (FIG. 4, step 5). Though this can be accomplished in any way desired, including vacuum evaporation or reverse osmosis, an example method is via a distillation process. An example method is to perform a stripping run identical to that done in a craft spirits methodology. In this way, the amount of ethanol left in the beer can be reduced to any arbitrarily small level, simply by letting the evaporation/distillation process go on long enough.

The ethanol that is evaporated off will typically be distilled back down into liquid form (FIG. 4, step 12), although it may also be simply discharged into the air, for instance. This distillate will largely be ethanol and water. Only trace amounts of other components end up in the distillate. This process is described below.

An important measurement in the process described herein is the amount of alcohol remaining in the base beer. This has a direct impact on the amount of ethanol in the final, combined beer. The preferred method for deciding when the AR process is complete is to use equipment that can precisely measure ethanol in a fluid. When the stillage reaches the target amount, the distillation ends. There are multiple such pieces of equipment available for sale in the market. Alternatively, other methods can be used to closely estimate the ethanol left in the Base Liquor, such as boiling point of the liquid.

In parallel with Alcohol Removal, the flavor wort can be made (FIG. 4, step 6). It can be made with the same basic process as a normal wort, by boiling extracted sugars from malts (gathered either through commercial malt extract or mashing grains), hops, adjuncts such as oats, flaked wheat, crystal malts, fruits, and virtually any other flavoring. The constraint on this is that the Original Gravity of the Flavor Wort should be such that it will produce no more alcohol than is desired. For a non-alcoholic malt beverage, that must be less than 0.5% of the final volume, taking into account any leftover alcohol from the Base Beer. For a low-alcohol beer, it must be designed to have the combined beer have the desired amount. This is discussed in detail below.

The Original Gravity of the Flavor Wort is calculated in an identical manner as any Original Gravity:

$$OG_F = 1 + \frac{\sum_{j=1}^{m} W_j * GPG_j}{V_F} \quad (21)$$

Where
 $W_j$=Weight of the $j^{th}$ Flavor Beer ingredient
 $GPG_j$=Gravity per Pound per Gallon of the $j^{th}$ Flavor Beer ingredient, including efficiency
 $V_F$=Volume of the Flavor Wort after boiling
 m=Number of Ingredients in Flavor Beer Once the flavor wort is boiled down to its desired volume, it is then combined with yeast and the Base Liquor (the Base Beer with alcohol removed). An example method is to use the yeast as washed from the base ferment (FIG. 4, step 4), but it can be fresh yeast, a different strain of yeast, or anything the brewer believes meets the needs of the overall beer.

This is now a Combined Beer, and it goes through a Combined Ferment (FIG. 4, step 7). During this ferment, the yeast will ferment the sugars from the flavor beer.

Once the Combined Ferment is complete, the Combined Beer goes into a Conditioning process (FIG. 4, step 8). This is identical to a standard beer brewing conditioning process. The Combined Condition is the time where additional flavors can be added, again in an identical manner as a standard beer. This is especially where the Dry Hop can occur, which adds flavors which are unique to specific craft beers and so are critical to creating flavorful beers that craft beer drinkers have come to expect.

The Combined Ferment/Combined Condition continues until the brewer decides to stop fermentation for any reason, such as that the Combined Beer has reached its desired alcohol limit, it has reached its desired flavor, or any other reason the brewer deems sufficient.

The Combined Beer is ready for clarification and carbonation (FIG. 4, step 10), and packaging (FIG. 4, step 11) in a similar manner to that of a standard craft beer.

In this example method, the ethanol removed from the Base Beer can be used to make craft distilled spirits. In the case of beer, it can be Malt Whiskey, if the base beer is made from primarily malted barley, which it will be in the majority of cases.

The alcohol removal process example implementation (FIG. 4, step 5) is heating the base beer up to boiling, and slowly boiling the fluid—precisely the first step in the distillation process in making craft distilled spirits. The steam from the boil carries away the ethanol, and makes the base beer's ABV drop to the point where the brewer needs it to be. That steam can be cooled and condensed (FIG. 4, step 12). The combination of the Alcohol Removal and Condensing stages is identical to a stripping run in making craft malt whiskey, and thus produces Low Wines. From this, the process to create the craft malt whiskey is identical to the standard procedure described in the background: The low wines can be stored and multiple batches mixed together (FIG. 4, step 13), the mixed low wines can be run through a still to produce the raw malt whiskey (FIG. 4, step 14), the raw whiskey aged and flavored (FIG. 4, step 15), and then packaged for sale (FIG. 4, step 16).

There are differences between a typical malt whiskey and a malt whiskey made with this process. A base beer is made primarily from base malts, just like a malt whiskey, but those malts may very well be different from those used to make malt whiskey. Some base malts used for beer are not typically used for whiskey, such as Munich or Vienna malts. The yeasts used to produce a base beer will not likely be the same yeasts used to ferment for malt whiskey, and different types of yeast produce different flavors. In some cases, a base beer will contain crystal malts or other darker malts that again are not used in the typical whiskey. And the base wort is boiled, which might or might not be the case for a whiskey wort. These differences will add up to a taste difference. However, all of these differences are well within the bounds of making craft whiskey.

An example method is described above. Many other methods using a two-wort, two-fermentation process are possible. Two alternate example methods are described below.

Figure 5:
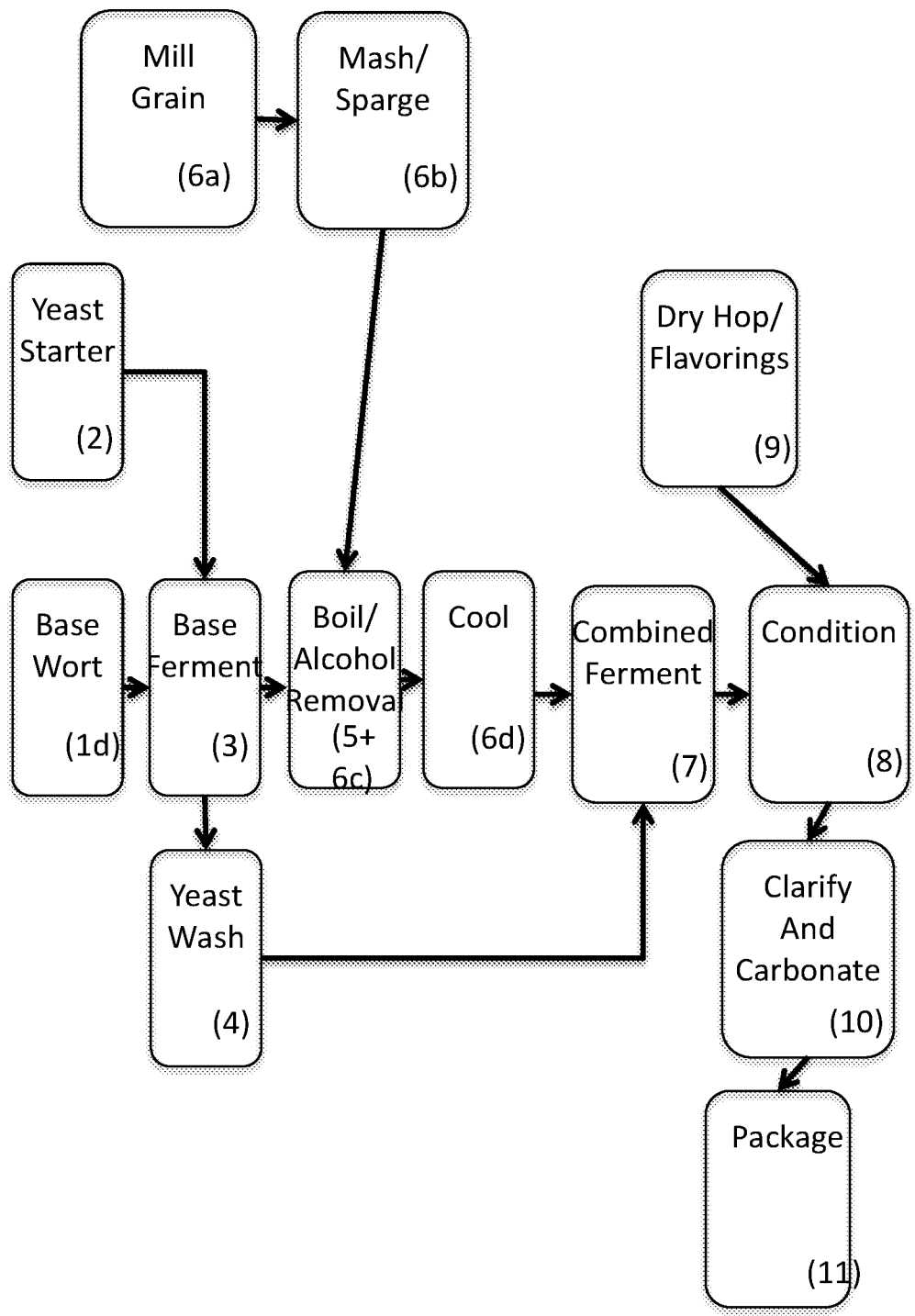
FIG. 5 is an illustration of an example alternate method B of implementing the invention where a distillation is not included in the process.

The first of these alternate methods, called Method B, can be used when a distillation is not possible or necessary. FIG. 5 shows the flow of this method.

The creation of the Base Wort, through the Base Ferment, is identical to the preferred method. The Flavor Wort creation is a bit different. The brewer can still select the same grains, grind them the same, and mash/sparge them the same. The difference is in how the Alcohol Removal is done, and how the Flavor Boil is done. These two steps are combined in Method B. The Base Beer, after being fermented, is combined with the un-boiled Flavor Wort, and the two are boiled together. This has the effect of removing the alcohol from the base beer (and the boil must be long and vigorous enough to complete that process), at the same time as boiling the flavor wort. Hops are added to this boil at the appropriate times. The combined wort then is cooled and fermented together, accomplishing the same goals as the combined ferment. The beer can then be processed in the same manner. Method B also encompasses when the base beer is boiled separately from the flavor wort, and then combined afterwards in a combined ferment, or when the base beer is boiled for a time and then the flavor wort is added to complete the boil.

Figure 6:
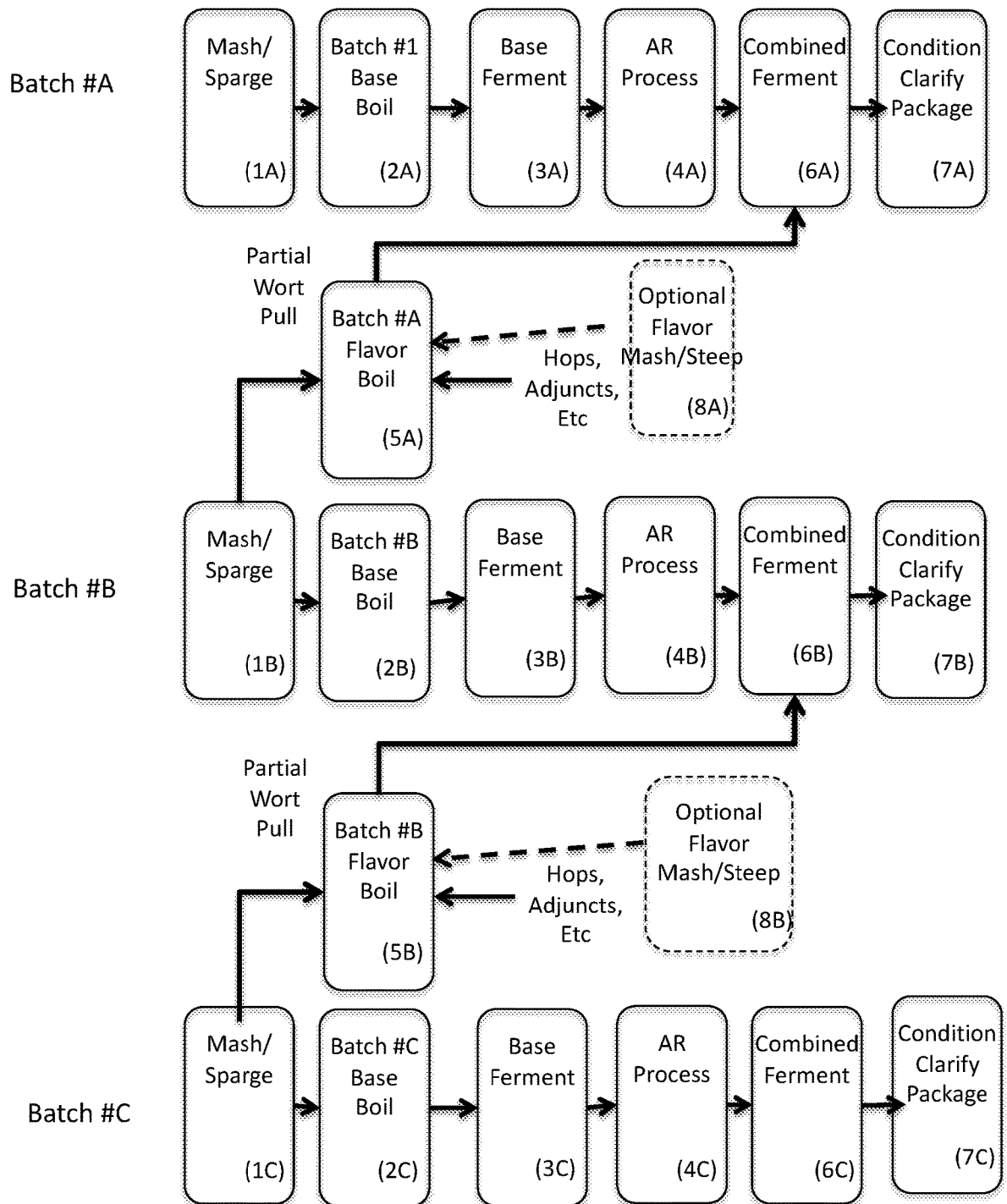
FIG. 6 is an illustration of an example alternate method C, which shows a method of implementing the invention wherein the wort for the base and flavor are done simultaneously.

A second alternate example method, called Method C, can be used when a beer is both (1) made in multiple batches at regular intervals, and (2) when the base and flavor grain bill contain the same the same base malts. This is shown in FIG. 6. In this case, instead of two different mash/sparge efforts (one for Base, one for Flavor), there is only one, saving time and effort. The resulting wort of the single mash/sparge is split between the flavor beer and the base beer. Note that this is similar to a Parti-Gyle brewing method, which is used in making some craft beers, though infrequently.

As shown in the diagram, the first batch (Batch #A) Base beer is done in a similar manner to the previously described example method. A Base wort is created, boiled, fermented, and has the alcohol removed, (FIG. 6, steps 1A, 2A, 3A, and 4A). The alcohol removal can be done with any of various methods, including distillation.

When doing the second batch (Batch #B), however, some or all the grains for both the base and flavor beers are combined into a single mash/sparge (FIG. 6, step 1B). A portion of the wort is separated out for the Base Wort of Batch #B, which is boiled, fermented, and has the alcohol removed, (FIG. 6, steps 1B, 2B, 3B, and 4B), in preparation for the third batch of the beer.

The other portion of the wort generated when performing this second mash/sparge (FIG. 6, Steps 1B) is then used for the Flavor Beer for Batch #A. Optionally, the brewer can, after the Base Beer wort has been collected, add additional grains into the Mash (FIG. 6, Step 8A) that are Flavor Beer specific. The wort from the continued Mash is then boiled with appropriate hops (FIG. 6, Step 5A), cooled, and combined with the alcohol-removed Base Beer. The combined wort is then fermented in the same manner as in the preferred method (FIG. 6, Step 6A).

Similarly, the Flavor Wort for Batch #B is generated when doing the combined mash/sparge for Batch #C (FIG. 6, Steps 1C and 8B).

Thus this simplifies the production of the beers created with this embodiment, needing only one mash/sparge per beer, though that mash/sparge is split between two batches of beer.

Designing A Beer Using This Embodiment A. A result of this example embodiment is to produce beers with low alcoholic content of 3.5% ABV or less. In order to use this embodiment, the brewer should be able to predict the outcome of the process. An important characteristic, for this embodiment, is the predicted ABV of the Combined Beer, and therefore should be accurately calculated before brewing. Also important are other characteristics such as IBU (bitterness) and Color, which should also be accurately predicted. All of these characteristics, while being similar to a standard craft beer, are calculated somewhat differently because of the two-wort, two-fermentation nature of this embodiment. And Combined Original Gravity (COG) of a beer made using this embodiment is calculated identically to an Original Gravity of a standard craft beer, but it means something different.

The calculations described below are for the example embodiment A. However, the other example embodiments use the same or very similar calculations.

Calculation Predicted ABV of a Combined Beer. The percentage of alcohol that will be in the combined beer is given by the equation:

$$ABV_C = ABV_{BR} * \left(\frac{V_{BR}}{V_C}\right) + ABV_F * \left(\frac{V_F}{V_C}\right) \quad (22)$$

Where
 $ABV_C$=Alcohol by Volume of the Combined Beer
 $ABV_{BR}$=Ratio of ethanol to total volume of base beer after alcohol removal
 $V_{BR}$=Volume of the base beer after alcohol removal
 $ABV_F$=Ratio of ethanol to total volume of flavor beer component after fermentation
 $V_F$=Volume of the flavor beer
 $V_C$=Volume of Combined Beer
 $ABV_B$=Alcohol by Volume of the Base Beer after Base fermentation but before AR process
 $V_{EB}$=Volume of Ethanol in the Base Beer Thus, In order to calculate a predicted ABV, both the residual alcohol left in the base beer after alcohol removal ($ABV_{BR}$) and alcohol that will be generated by the flavor wort ($ABV_F$) in the Combined Ferment should be taken into account.

We can see that we need to calculate, then, the ethanol concentration of the flavor beer, $ABV_F$. This is complicated by the fact that some of the constituents added to the flavor beer will add to the gravity, but will not be fermentable. For instance, black malt adds some 27 points per pound per gallon, but since it has been roasted in a kiln, the sugars will be carmelized and oxidized, and thus many of them will not ferment. Other ingredients, such as lactose, are not fermentable at all. In a standard craft beer, this effect is negligible or unimportant. However, when making an NA or LA beer, it becomes significant. Thus, the calculations to predict $ABV_F$ should account for that. Beginning with equation (11):

$$ABV=(OG-FG)*131.35 \quad (11)$$

We can use equation (21) for the $OG_F$ calculation, but the FG will have to take the fermentability of each ingredient into account. In this case, $$FG_F = 1 + \frac{\sum_{j=1}^{m} W_j * GPG_j * (1 - A_M * F_j)}{V_F} \quad (23)$$

Where
 $F_j$=The percentage of gravity that is fermentable for the $j^{th}$ ingredient.

So we can see that the Final Gravity simply has the attenuation modified for each ingredient. Using that fact, and equation (15), we get $$ABV_F = 131.25 * \left(\frac{\sum_{j=1}^{m} W_j * GPG_j * A_M * F_j}{V_F}\right) \quad (24)$$

Note that we are using Equation (11) to calculate $ABV_F$. The determination how to estimate this is up to the brewer. However, this equation is accurate at low ethanol concentrations, which, for this embodiment, will typically be the case, especially in the case of a NA beer. In the case of a reduced-alcohol beer, this equation is still usually accurate. However, the choice between equations 15 and 16 will be up to the brewer and may depend on the specific situation.

The ethanol by volume of the base beer after alcohol removal can be a constant. That is, the evaporative process can be run until an $ABV_{BR}$ is reached that is good enough for the particular beer or process. It can be a design point, setting $ABV_{BR}$ to 0.25%, for instance. The brewer will use samples from the base beer during alcohol removal to measure this, and will quit when it reaches that. A similar methodology can be used if Reverse Osmosis or other methodology is used.

Volume Calculations. Before proceeding with calculating the estimated ABV of the final beer, the volumes of the various factors should be calculated. Clearly, $$V_C = V_{BR} + V_F + V_{MU} \quad (25)$$

Where
 $V_{MU}$=Volume of Make Up Water (amount of water added to make the volume equal to $V_C$ if the other two volumes are not sufficient. Assumed to be zero for this discussion)

And
 $V_{BR}$=volume of the base beer after ethanol removal
 It is clear that $$V_{BR} = V_B - V_D \quad (26)$$

$V_C$ is generally determined prior to the beer design, as it is the 'batch size,' the size of the overall batch to be produced. This is determined largely by the equipment in a brewery, primarily the fermenter size.

A method is then needed to calculate both $V_F$, the volume of the flavor beer, and $V_D$, the volume of the distillate. In order to do this, the volume of the base beer after alcohol removal must be predicted So it is necessary to know, or at least closely estimate, what $V_D$, the volume of the distillate is. Given that it is assumed $ABV_{BR}$ is a constant, $$ABV_{BR} = \frac{V_{ER}}{V_{BR}} \quad (27)$$

Where
 $V_{ER}$=Volume of Ethanol remaining the the base after alcohol removal

So $$ABV_{BR} = \frac{ABV_B * V_B - ABV_D * V_D}{V_B - V_D} \quad (28)$$

Solving for the volume of the distillate, we get:

$$V_D = V_B * \frac{ABV_B - ABV_{BR}}{ABV_D - ABV_{BR}} \quad (29)$$

We now need to estimate $AVB_B$ and $ABV_D$.

Because the base beer typically has a much higher ethanol concentration, the preferred estimation method for $ABV_B$ is to use equation 16:

$$ABV_B = \left(76.08 * A_M * \frac{\sum_n^1 W_k * GPG_k}{V_B * 0.775 - \sum_n^1 W_k * GPG_k}\right) * \qquad (30)$$

$$\left(\frac{1 + (1 - A_M) * \frac{\sum_n^1 W_k * GPG_k}{V_B}}{0.794}\right)$$

Note that, for the Base Beer, we assume all malts will be fermentable. This is typically the case. Note also that the Volume of the Distillate, $V_D$, is dependent on the ethanol concentration of the distillate, $ABV_D$. While there are some ways to predict the distillate concentration, they depend on such variables as altitude and type of distillation (e.g. pot vs reflux distillation), and even the individual equipment being used and, in a larger sense, the method of alcohol removal. It is thus more practical to estimate $ABV_D$ by experimental methods using the equipment and location in which this embodiment will be used. Thus, $ABV_D$ also becomes a constant with which the brewer will design a beer.

Once the $V_D$ is estimated, the brewer can then simply calculate the needed volume for the flavor beer:

$$V_F = V_C - (V_D - V_D) \qquad (31)$$

Also, $$V_{BR} = V_B - V_D \qquad (32)$$

In a typical beer design scenario, the brewer would set the volumes for the batch and the base beer, and use this equation to calculate the desired volume of the flavor beer.

The volumes should be set such that the gravities of both the flavor and base beers are reasonable. Typically, an OG for either a base or combined beer will be less than 1.100, and more likely 1.060 or less. This allows a full attenuation of the base beer, which is critical to creating a NA beer. This volume setting can be done in an iterative manner, setting a base volume, calculating the OGs, and iterating. Of course, it is easy to automate these calculations.

Now, we can finish calculating the ethanol content of the combined, final beer. Reiterating Equation (22):

$$ABV_C = ABV_{BR} * \left(\frac{V_{BR}}{V_C}\right) + ABV_F * \left(\frac{V_F}{V_C}\right) \qquad (22)$$

And substituting in equations (31) and (32), we get:

$$ABV_C = ABV_{BR} * \left(\frac{V_B - V_D}{V_C}\right) + ABV_F * \left(\frac{V_C - (V_B - V_D)}{V_C}\right) \qquad (33)$$

Further substituting equations (29), we get:

$$ABV_C = ABV_{BR} * \left(\frac{V_B - V_B * \frac{ABV_B - ABV_{BR}}{ABV_D - ABV_{BR}}}{V_C}\right) \qquad (34)$$

$$+ ABV_F * \left(\frac{V_C - V_B\left(1 - \frac{ABV_B - ABV_{BR}}{ABV_D - ABV_{BR}}\right)}{V_C}\right)$$

And, to reiterate:
$V_C$=Volume of Combined beer going into the fermeter, set by the brewery's batch size
$AVB_{BR}$=A constant, the percentage of ethanol left in the base beer after AR, a design point set by the brewer.
$V_B$=Volume of Base beer going into the fermeter prior to the AR process $$ABV_B = \left(76.08 * A_M * \frac{\Sigma_n^1 W_k * GPG_k}{V_B * 0.775 - \Sigma_n^1 W_k * GPG_k}\right) * \qquad (20)$$

$$\left(\frac{1 + (1 - A_M) * \frac{\Sigma_n^1 W_k * GPG_k}{V_B}}{0.794}\right)$$

or could use the alternate equation, or the brewer's best estimate.

$AVB_D$=A constant, the percentage of ethanol in the distillate, which depends on the process and equipment used to perform the AR process $$ABV_F = 131.25 * \left(\frac{\sum_{j=1}^m W_j * GPG_j * A_M * F_j}{V_F}\right) \qquad (24)$$

$$V_F = V_C - (V_B - V_D) \qquad (31)$$

Equation (34), along with equations (20), (24), and (31), are the critical ones used in designing a beer using this process as they allow a close prediction of ethanol content. The brewer can plug recipe ingredients into them via the weights and GPGs of the malts, and add constants such as the maximum attenuation and the distillate concentration, and it will give the brewer a closely predicted ABV.

For comparison, the equivalent equation to simply brew a craft beer with standard methods is:

$$ABV = \left(76.08 * A * \frac{\frac{\sum_n^1 W_k * GPG_k}{V}}{0.775 - \frac{\sum_n^1 W_k * GPG_k}{V}}\right) * \qquad (35)$$

$$\left(\frac{1 + (1 - A) * \frac{\sum_n^1 W_k * GPG_k}{V}}{0.794}\right)$$

Combined Original Gravity. In a standard craft beer, the Original Gravity is an important design consideration, as it will tell the brewer how much body the final beer will have, and is an important indicator of ABV. In this method, there are two original gravities. For this embodiment, the Combined Original Gravity (COG) has a similar function to the OG of a standard craft beer. The COG is simply what an Original Gravity would be if one added up all the gravities of all the ingredients in both the Base and Flavor Beers:

$$COG = 1 + \frac{\sum_{j=1}^m W_{jF} * GPG_{jF} + \sum_{i=1}^n W_{iB} * GPG_{iB}}{V_C} \qquad (36)$$

The COG is an indicator of the overall body of the Combined Beer, in much the same way as OG is of a standard craft beer. COG does not give an indication of alcoholic content in the same way as OG does, however.

IBU calculations for combined beer. To calculate the IBU of the combined beer, a similar process can be used. However, in the typical process, hops are not added to the base beer. While this is possible and is covered by this embodiment, doing so complicates the Utilization calculation, especially if the AR process uses heat for evaporation or distillation. Further, there is no need and it adds nothing to the beer. The preferred method is adding hops only to the flavor wort. In this case, the IBU of the combined beer is simply:

$$IBU_C = IBU_F * \left(\frac{V_F}{V_C}\right) \quad (37)$$

Thus, if the flavor beer is half the volume of the combined, the IBU of the combined beer will be half the IBU of the flavor beer. This must be taken into account during the design of the combined beer, as an important factor for taste is the IBU of the combined beer.

The predicted IBU of the flavor beer must be calculated in the same way as a standard beer, using the equation:

$$IBU_F = \frac{75 * \sum_{k=1}^{n} AAU_k * U_k}{V_F} \quad (9)$$

The utilization calculation will use the gravity and time of boil of the flavor wort as its inputs.

Combining equations 9 and 37, we get:

$$IBU_C = \frac{75 * \sum_{k=1}^{n} AAU_k * U_k}{V_C} \quad (38)$$

Note that while this looks identical to simply adding the hops to a larger beer, the Utilization is affected by the gravity of the flavor boil. Recall that:

$$U = F(G) * F(T) \quad (6)$$

Where $$F(G) = 1.65 * 0.000125^{(Gb-1)} \quad (7)$$

$$F(T) = \frac{1 - e^{-0.04*T_B}}{4.15} \quad (8)$$

Where $T_B$ is the boil time of the wort.

So F(G) depends on the gravity of the wort being boiled. In the case of beer made with this process, the gravity of the flavor boil will often be far less than a standard beer, and the IBU calculations are affected similarly.

If a brewer desires to add hops to the base beer, the combined equation becomes:

$$IBU_C = IBU_B * \left(\frac{V_B}{V_C}\right) + IBU_F * \left(\frac{V_F}{V_C}\right) \quad (39)$$

Where $IBU_B$ is the IBU of the base beer. In this case the utilization must take not only the wort boil into account but also the AR process. In this case it may be difficult to predict the IBU of the base, and thus of the combined beer.

Estimating combined beer color. The color of the combined beer will be as if a single beer was made from all the ingredients.

$$SRM_C = 1.4922 * MCU_C^{0.6859} \quad (40)$$

$$MCU_C = \frac{\sum_{i=1}^{n} MC_{iB} * W_{iB} + \sum_{j=1}^{m} MC_{jF} * W_{jF}}{V_C} \quad (41)$$

Where
  $SRM_C$=Standard Reference Method Color of Combined Beer
  $MCU_C$=Malt Color Units of the Combined Beer
  $MC_{iB}$=Malt Color of ith ingredient of Base Beer
  $W_{iB}$=Weight of the ith ingrdient of Base Beer
  $MC_{jF}$=Malt Color of jth ingredient of Base Beer
  $W_{jB}$=Weight of the jth ingrdient of Base Beer
  $V_C$=Volume of Combined Beer In summary, the brewer will design the beer using ingredients of his or her choosing, and use the above equations, supplying the constants, to predict the outcome of the beer. Again, it is possible to use other methods to predict the beer characteristics; the ones above are simply example methods of this embodiment.

There are additional complications that have been ignored in this discussion, and while they do not affect the process, they should be noted:
  The Attenuation number $A_M$ could be different between the Base and Combined ferment.
  This ignores such issues as fermenter losses and boil kettle losses. These can complicate the calculation of the parameters above, but does not change the fundamental process.

Example. To facilitate understanding of the invention, we will use an example of a simple beer—a Blonde American Ale. The volume is to be one barrel, or 31 gallons. Taking into account fermenter loss, we want then the volume of the combined beer to be about 10% higher than that, or 34 gallons. These volumes, of course, can be scaled up or down. The following are the assumptions used in the recipe:
  Batch Volume ($V_C$): 34 Gallons
  Base Boil Time ($T_B$): 30 minutes
  Flavor Boil Time ($T_B$): 60 minutes
  ABV of Base after alcohol Removal (ABVBR): 1%
  ABV of Distillate ($ABV_D$): 40%
Recipe
Grains

|  | Weight (lbs) | GPG | Lovibond | Fermentability |
|---|---|---|---|---|
| Base Beer | | | | |
| Pale 2-Row Malt | 37.0 | .028 | 1.8 | 100% |
| Flavor Beer | | | | |
| Pale 2-Row Malt | 25 | .028 | 1.8 | 100% |
| Crystal 20 | 3.0 | .026 | 20 | 80% |

Note here that the GPG includes, per the discussion above, the efficiencies. It is customary to refer to a grain's PPG, or Points per Pound per Gallon. A Point in this case increases the gravity by 1/1000, or 0.001. 2-row is about 37 PPG, so one pound of 2-row would increase the gravity of one gallon by 0.0037. Also, the efficiencies are included. In this case the efficiency is 75%, or we expect to get 75% of the potential gravity from the grain into the fermenter. This is also known as Brew House Efficiency. So, the GPG is 0.75*37/1000=0.028. Similarly for the other grains.

In practice, this calculation is automated via a spreadsheet or similar tool.

Hops

|  | Weight (ounces) | Boil Time (minutes) | Alpha Acid percentage |
|---|---|---|---|
| Willamette | 10 | 60 | 4.5 |

Yeast

|  | Expected Maximum Attenuation ($A_M$) |
|---|---|
| S-05 | 85% |

We will first calculate the Combined Original Gravity, given by:

$$COG = 1 + \frac{\sum_{j=1}^{m} W_{jF} * GPG_{jF} + \sum_{k=1}^{n} W_{iB} * GPG_{iB}}{V_C} \quad (36)$$

OR $$COG = 1 + \frac{(25 * 0.028 + 3 * 0.026) + 37 * 0.028}{34}$$

OR

COG=1.053

COG is instructive, as it shows the brewer what the beer would be if using the same ingredients to make a beer using the normal craft beer methodology. In this case, a Blonde made from these grains and yeast would be a medium-bodied beer with about 6% ABV. Using the methodology described here, the beer, as shall be shown, will have about half that alcoholic content, yet will have a similar body and taste compared to a standard beer.

We now wish to calculate the ABV, SRM, and IBU values we would expect from this. The ABV is given by:

$$ABV_C = ABV_{BR} * \left( \frac{V_B - V_B * \frac{ABV_B - ABV_{BR}}{ABV_D - ABV_{BR}}}{V_C} \right) + \quad (34)$$

$$ABV_F * \left( \frac{V_C - V_B\left(1 - \frac{ABV_B - ABV_{BR}}{ABV_D - ABV_{BR}}\right)}{V_C} \right)$$

Where we set $V_B$ to 18 gallons. In practice this is done iteratively, where the equations are in a spreadsheet or similar tool, and the brewer sets $V_B$ to various values, and picks the one where other values are reasonable, such as $V_F$, and the Original Gravities of the Base and Flavor beers. Note that $V_C$ is the batch size, or 34 gallons.

We next calculate $ABV_B$:

$$ABV_B = \left( 76.08 * A_M * \frac{\frac{\sum_{h}^{1} W_k * GPG_k}{V_B}}{0.775 - \frac{\sum_{h}^{1} W_k * GPG_k}{V_B}} \right) * \quad (20)$$

$$\left( \frac{1 + (1 - A_M) * \frac{\sum_{h}^{1} W_k * GPG_k}{V_B}}{0.794} \right)$$

OR $$ABV_B = \left( 76.08 * 0.85 * \frac{\frac{37 * 0.028}{18}}{0.775 - \frac{37 * 0.028}{18}} \right) * \left( \frac{1 + (1 - 0.85) * \frac{37 * 0.028}{18}}{0.794} \right)$$

OR $ABV_B$=6.5%

Now, $AVB_{BR}$, or the AVB of the base beer after removal of the alcohol, can be set to whatever works for the particular beer. In practice, for low alcohol beer, a value of 1% is very workable.

$ABV_{BR}$=1.0%

$AVB_D$, or the percentage of alcohol in the distillate, is determined via experimental methods using the equipment available. It is related to $AVB_{BR}$, but the brewer can determine a small subset of points for both values needed and measure them. If a brewer is making both low-alcohol beer and non-alcoholic beer, two values will be practical, one for each type of beer. A good rule of thumb is that for low-alcohol beer of 2.5%-3.0%, an $AVB_{BR}$ of 1% and an $AVB_D$ of 40% is reasonable, while for a non-alcoholic beer, and $AVB_{BR}$ of 0.25% and an $AVB_D$ of 25% is reasonable. These will result in very close approximations for the volumes wanted with the equipment used to make this beer. Thus, for this example beer, we will use:

$ABV_D$=40.0%

Now we desire to calculate AVBF, the percentage of alcohol in the Flavor beer. This is given by Equation 24:

$$ABV_F = 131.25 * \left( \frac{\sum_{j=1}^{m} W_j * GPG_j * A_M * F_j}{V_F} \right) \quad (24)$$

In this case, there are two grains, so $$ABV_F = 131.25 * \left( \frac{25 * 0.028 * 0.85 * 1 + 3 * 0.026 * .85 * .8}{V_F} \right)$$

Now we desire to calculate VF, the volume of the Flavor beer. This is given by:

$$V_F = V_C - (V_B - V_D) \quad (31)$$

Where $$V_D = V_B * \frac{ABV_B - ABV_{BR}}{ABV_D - ABV_{BR}} \qquad (29)$$

So $$V_D = 18 * \frac{6.5 - 1}{40 - 1}$$

So $$V_D = 2.6$$

OR $$V_F = 34 - (18 - 2.6)$$

Thus $$V_F = 18.6$$

Now we can finish the AVBF calculation:

$$ABV_F = 131.25 * \left( \frac{25 * 0.028 * 0.85 * 1 + 3 * 0.026 * .85 * .8}{18.6} \right)$$

OR

ABV$_F$=4.6%

Plugging all this into equation 34, or $$ABV_C = ABV_{BR} * \left( \frac{V_B - V_B * \frac{ABV_B - ABV_{BR}}{ABV_D - ABV_{BR}}}{V_C} \right) + \qquad (34)$$

$$ABF_F * \left( \frac{V_C - V_B\left(1 - \frac{ABV_B - ABV_{BR}}{ABV_D - ABV_{BR}}\right)}{V_C} \right)$$

We get $$ABV_C = 1 * \left( \frac{18 - 18 * \frac{6.5 - 1}{40 - 1}}{34} \right) + 4.5 * \left( \frac{34 - 18\left(1 - \frac{6.5 - 1}{40 - 1}\right)}{34} \right)$$

OR

ABV$_C$=2.96%

The next step in designing this example beer is to calculate the bitterness, or IBU, derived from the hops. We know from above that:

$$IBU_C = \frac{75 * \sum_{k=1}^{n} AAU_k * U_k}{V_C} \qquad (38)$$

Where $$U = F(G) * F(T) \qquad (6)$$

And $$F(G) = 1.65 * 0.000125^{(Gb-1)} \qquad (7)$$

$$F(T) = \frac{1 - e^{-0.04 * T_B}}{4.15} \qquad (8)$$

$T_B$ is the time of boil, or 60 minutes. $G_b$ is the gravity of the boiling wort when the hops are put in. Here, the calculations are familiar to anyone who has brewed beer and are dependent upon equipment parameters. So we will simply state that, for the equipment used to make this beer, $G_b$ is 1.036.

For this simple beer, we have chosen just a single hop addition. The hops we have chosen, Willamette, have an Alpha Acid percentage of 4.5, and the weight it 10 ounces. So, $$IBU_C = \frac{75 * (10 * 4.5) * 1.65 * 0.000125^{(1.036-1)} * \frac{1 - e^{-0.04 * 60}}{4.15}}{34}$$

OR

IBU$_C$=26

Lastly, we wish to calculate the color of the beer, or SRM:

$$SRM_C = 1.4922 * MCU_C^{0.6859} \qquad (40)$$

$$MCU_C = \frac{\sum_{i=1}^{n} MC_{iB} * W_{iB} + \sum_{j=1}^{m} MC_{jF} * W_{jF}}{V_C} \qquad (41)$$

$$MCU_C = \frac{1.8 * 37 + (1.8 * 25 + 20 * 3)}{34}$$

$$MCU_C = 5.05$$

AND

SRM$_C$=1.4922*5.05$^{0.6859}$

SRM$_C$=4.53

This completes the design of the beer. We have a beer that is light-colored (SRM of 4.53), with moderate bitterness (26 IBU), and an alcoholic content of right at 3%.

The making of the beer is thus straightforward, using the following steps:

Make the Base Wort, using standard techniques, using the materials for the base beer. That is, mash 37 pounds of pale 2-row malt at 152 F. for 60 to 75 minutes. The temperature can be modified to suit the brewer's desires, exactly as making a beer using standard methods.

Boil the Base Wort for 30 minutes, adding no hops. Other ingredients such as clarifier (Whirlfloc or similar) and yeast nutrient are added at brewer's discretion.

Cool the wort to 68 F., and transfer it to a sterilized fermenter.

Pitch 70 grams of the S-05 yeast.

Let ferment until it is fully attenuated, approximately 5-10 days.

Transfer the fermented beer into a pot still, and distill until the remaining beer in the still reaches 1% ABV. Do this by sampling and measuring. Collect the distilled spirits, called Low Wines, and store them.

Cool the remaining beer to 68 F., and transfer into a fermenter for the combined fermentation.

Make the Flavor wort using standard techniques, Mashing the Flavor grains at 152 F. for 60 to 75 minutes. Again, the temperature and mash times can be adjusted based on the brewer's desires.

Boil the Flavor wort for 60 minutes, adding the hops when the boil starts. Add clarifier and yeast nutrient as would be done in a standard beer.

Cool the wort to 68 F., and transfer it to the same fermenter where the base beer with alcohol removed lies.

Pitch 55 grams of yeast into the combined beer, and let ferment and condition for approximately 10-14 days.

At this point, the combined beer is ready to carbonate and package, in an identical manner to any standard beer.

Repeat this process as many times as desired, collecting the Low Wines each time and mixing it with other batches of Low Wines.

When the volume of Low Wines reaches enough to distill an entire batch, transfer them all to the still, and distill these a second time. This is now standard, double-distilled whiskey. If made as described above, it is Malt Whiskey, made with only Malted Barley.

Age as desired before diluting to about 40% ABV and packaging.

This invention, while focused on the creation of low and non-alcoholic beer, should not be construed as being limited to beer. The two-stage, two-ferment process is applicable to many other alcoholic beverages such as wine, cider, other fruit fermentations, etc.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

What is claimed is:

1. A method for making craft beer of less than 3.5% alcohol by volume, comprising:
    (a) brewing and fermenting a first wort, creating a first beer;
    (b) distilling the first beer, producing a distillate and a backset;
    (c) brewing a second wort;
    (d) combining a volume of the backset and a volume of the second wort;
    (e) fermenting the backset and the second wort combination, creating a combined beer;
    (f) finishing the combined beer by adding dry hops, flavoring, or both to the combined beer, conditioning the combined beer, carbonating the combined beer, and clarifying the combined beer to produce a volume of the craft beer having less than 3.5% alcohol by volume;
    where the second wort has a gravity such that $(131.35*(OG-FG)*(Vf/(Vf+Vbr)))$ is less than or equal to 3.5, where OG is the original gravity of the second wort, FG is the final gravity of the combined beer, Vf is the volume of the craft beer, and Vbr is the volume of the backset used in step (d).

2. A method for making craft beer of less than 3.5% alcohol by volume, comprising:
    (a) brewing and fermenting a first wort, creating a first beer;
    (b) distilling the first beer, producing a distillate and a backset;
    (c) re-fermenting the backset;
    (d) brewing a second wort;
    (e) fermenting the second wort;
    (f) combining a volume of the re-fermented backset and a volume of the fermented second wort, creating a combined beer;
    (g) finishing the combined beer by adding dry hops, flavoring, or both to the combined beer, conditioning the combined beer, carbonating the combined beer, and clarifying the combined beer to produce a volume of the craft beer having less than 3.5% alcohol by volume;
    where the second wort has a gravity such that $(131.35*(OG-FG)*(Vf/(Vf+Vbr)))$ is less than or equal to 3.5, where OG is the original gravity of the second wort, FG is the final gravity of the combined beer, Vf is the volume of the craft beer, and Vbr is the volume of the re-fermented backset used in step (f).

3. The method of claim 1, where the distillate is combined with the distillate of multiple such distillations; then distilled a second time in a pot still; and the result of said second distillation is finished, aged, and packaged as whiskey.

4. The method of claim 1, where the distillate is re-distilled using column distillation or multiple distillations to create a distilled alcoholic beverage other than whiskey.

5. The method of claim 1, where the first beer is distilled by heating it to boiling in a still to remove the alcohol via evaporation, and collecting the evaporated vapors by cooling and condensing them.

6. The method of claim 1, where the first beer is distilled by vacuum distillation.

7. The method of claim 1, where the first beer has its alcohol removed by reverse osmosis.

* * * * *